(12) United States Patent
Tsigler et al.

(10) Patent No.: US 8,009,587 B2
(45) Date of Patent: Aug. 30, 2011

(54) SYSTEM AND METHOD OF DISCOVERY OF WIRELESS CONTROL DEVICE

(75) Inventors: Andrey L. Tsigler, Hillsborough, NC (US); Kishore B. Padmanabha, Morrisville, NC (US); Dana L. Fowler, Fuquay-Varina, NC (US); Murali K. Policharla, Karnataka (IN)

(73) Assignee: Broadcom Corporation, Irvine, CA (US)

( * ) Notice: Subject to any disclaimer, the term of this patent is extended or adjusted under 35 U.S.C. 154(b) by 1081 days.

(21) Appl. No.: 11/823,233

(22) Filed: Jun. 27, 2007

(65) Prior Publication Data

US 2008/0273485 A1 Nov. 6, 2008

Related U.S. Application Data

(60) Provisional application No. 60/927,096, filed on May 1, 2007.

(51) Int. Cl.
*H04L 12/28* (2006.01)
(52) U.S. Cl. ........ 370/254; 370/328; 370/400; 709/220; 455/507; 455/561

(58) Field of Classification Search .................. None
See application file for complete search history.

(56) References Cited

U.S. PATENT DOCUMENTS

| | | | |
|---|---|---|---|
| 7,164,663 B2 * | 1/2007 | Frank et al. | 370/328 |
| 7,526,312 B2 * | 4/2009 | Martin | 455/552.1 |
| 7,542,572 B2 * | 6/2009 | Meier et al. | 380/277 |
| 7,567,805 B2 * | 7/2009 | Cox et al. | 455/435.1 |
| 2004/0063455 A1 * | 4/2004 | Eran et al. | 455/525 |
| 2005/0059396 A1 * | 3/2005 | Chuah et al. | 455/435.1 |
| 2005/0174998 A1 * | 8/2005 | Vesterinen et al. | 370/354 |
| 2006/0193284 A1 * | 8/2006 | Stieglitz et al. | 370/328 |

* cited by examiner

*Primary Examiner* — Daniel J Ryman
*Assistant Examiner* — Brian Roberts
(74) *Attorney, Agent, or Firm* — Brake Hughes Bellermann LLP

(57) ABSTRACT

Disclosed herein is a wireless infrastructure node configured to receive a discovery message from a wireless control device, and reply to the wireless control device with a connection request if the wireless infrastructure node is not statically assigned to another wireless control device and the wireless infrastructure node is not being managed by another wireless control device.

14 Claims, 16 Drawing Sheets

Wireless Control
Device 108a

Wireless Control
Device 108b

Discovery message 200

Compare
addresses

Connection request 1002

FIG. 10

SYSTEM AND METHOD OF DISCOVERY OF WIRELESS CONTROL DEVICE

CLAIM FOR PRIORITY

This Application claims the benefit of priority based on U.S. Provisional Application No. 60/927,096, filed on May 1, 2007, entitled, "System and Method of Discovery of Wireless Control Device," the disclosure of which is hereby incorporated by reference.

TECHNICAL FIELD

This description relates to discovering devices in a network.

BACKGROUND

Computer networks designed to allow wireless access to the network may include a number of wireless infrastructure nodes, such as 802.11 access points. The wireless infrastructure nodes may be managed by wireless control devices. The association between wireless infrastructure nodes and wireless control devices may involve various protocols.

SUMMARY

According to one general aspect, a wireless infrastructure node is configured to receive a discovery message from a wireless control device, and reply to the wireless control device with a connection request if the wireless infrastructure node is not statically assigned to another wireless control device and the wireless infrastructure node is not being managed by another wireless control device.

According to another general aspect, a wireless infrastructure node may be configured to receive a re-link message from a wireless control device, break a connection with the wireless control device in response to receiving the re-link message, and send a discovery message to another wireless control device after breaking the connection.

According to another general aspect, a wireless control device may be configured to receive a discovery message from another wireless control device, the discovery message including an address of the another wireless control device. The wireless control device may be further configured to compare the address of the another wireless control device to an address of the wireless control device, and send a connection to the another wireless control device based on the comparing.

The details of one or more implementations are set forth in the accompanying drawings and the description below. Other features will be apparent from the description and drawings, and from the claims.

BRIEF DESCRIPTION OF THE DRAWINGS

FIG. 10 is a diagram showing messages sent between the first wireless control device and the second wireless control device when the first wireless control device invites the second wireless device to join a peer group of the first wireless control device, according to an example embodiment.

DETAILED DESCRIPTION

Figure 1:
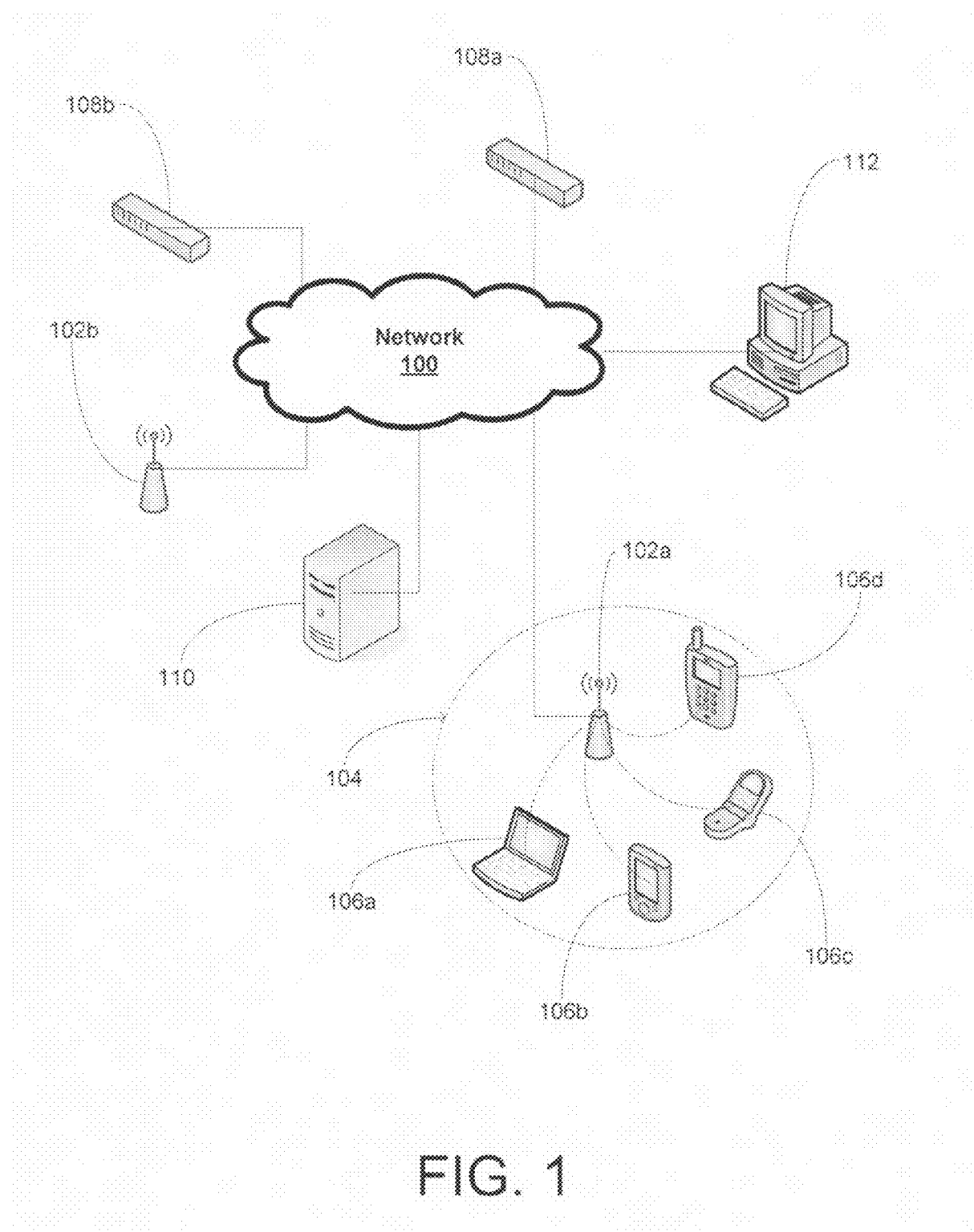
FIG. 1 is a diagram showing devices in a network, according to an example embodiment.

FIG. 1 is a diagram showing devices in a network 100, according to an example embodiment. The network 100 may provide connectivity between devices in a large space, such as an office building, for example.

The network 100 may include an Ethernet network, for example. Devices in the network 100 may communicate according to the Ethernet Protocol, or according to an Internet Protocol, such as Internet Protocol version 4, according to an example embodiment.

The network 100 may include a plurality of wireless infrastructure nodes 102a, 102b. The wireless infrastructure nodes 102 may be coupled to the network 100, such as by wired connections. The wireless infrastructure nodes 102 may be associated with a virtual local area network within the network 100, according to an example embodiment. The wireless infrastructure nodes 102 may include IEEE 802.11 access points base stations, relay stations, or other infrastructure nodes, according to example embodiments. Other standards or technologies may also be used for infrastructure nodes.

The wireless infrastructure nodes 102 may each form a wireless network 104. The wireless network 104 may include a plurality of wireless devices 106 in wireless communication with a wireless infrastructure node 102. The wireless devices 106 may include, for example, a laptop computer 106a, a personal digital assistant 106b, a cellular phone 106c, and/or a Smartphone 106d.

As the wireless devices 106 move from one location to another, the wireless devices 106 may come into closer proximity with another wireless infrastructure node 102. It may then be desirable to join the wireless network 104 of the closer wireless infrastructure node 102. The network 100 may include devices which manage the handoff of a wireless device 106 from the wireless network 104 of a first wireless infrastructure node 102a to a wireless network (not shown) of a second wireless node 102b.

The network 100 may include one or more wireless control devices 108a, 108b which manage the wireless infrastructure nodes 102. The wireless control devices 108 may be coupled to the network 100 by a wired connection, for example. The wireless control devices 108 may manage the wireless infrastructure nodes 102, such as wireless infrastructure nodes 102 within a virtual local area network, by creating peer groups of wireless infrastructure nodes 102 and/or wireless control devices 108, or by managing handoffs of wireless devices 106 between wireless networks 104, for example. Wireless control devices 108 may perform a variety of control or management tasks associated with managing one or more wireless infrastructure nodes 102, such as provisioning or configuring infrastructure nodes, e.g., downloading software or firmware upgrades, configuring the nodes for operation on specific channels, managing handoffs between infrastructure nodes, and the like.

According to an example embodiment, one or more of the wireless control devices 108 may include (or be provided as) a network switch, a network router, or other network device. The wireless control device may include a processor, memory, and a network interface. The wireless control devices may include software that may be executed by the processor or controller thereon, which may cause the wireless control device 108 to perform the various tasks described herein, such as communicating with other devices and/or managing or controlling various wireless infrastructure nodes 102, for example.

The wireless control devices 108 may discover and associate with other wireless control devices 108 or wireless infrastructure nodes 102 in the network 100 by sending or receiving discovery messages, which are discussed with reference to FIG. 2, according to an example embodiment. For example, the wireless control devices 108 may be configured with a list including a plurality, such as up to 256, Internet Protocol devices for wireless infrastructure nodes 102 and other wireless control devices 108 with which the wireless control device 108 may associate. In this example, the wireless control device 108 may send a discovery message, such as a Uniform Datagram Protocol (UDP) packet, to each Internet Protocol address in the list. This process is discussed in further detail with reference to FIG. 5.

According to another example, in which the wireless control device 108 may not be configured with a list of Internet Protocol addresses (such as IP addresses of the infrastructure nodes 102 and/or other wireless control devices 108), the wireless control device 108 may send a discovery message, such as in an Ethernet multicast format, to each device in the network 100. This process is discussed in further detail with reference to FIG. 6. These processes of discovery with or without a configured list of addresses, as well as other processes which may be performed by the wireless control device 108, are discussed in further detail with reference to FIG. 7.

The network 100 may include a Dynamic Host Configuration Protocol (DHCP) server 110, according to an example embodiment. The DHCP server 110 may be coupled to the network 100 by, for example, a wired connection. The DHCP server 110 may assign Internet Protocol addresses to the wireless infrastructure nodes 102 and/or wireless control devices 108 upon receipt of DHCP discover packets from the wireless infrastructure nodes 102 and/or wireless control devices 108. The wireless infrastructure nodes 102 and/or wireless control devices 108 may send the DHCP discover packets to the DHCP server 110 by broadcasting the DHCP discover packet through the network 100 upon startup, according to an example embodiment. Either before, after, or during assignment of an Internet Protocol address to a wireless infrastructure node 102, the DHCP server 110 may also assign a DHCP assigned address to the wireless infrastructure node 102. If the wireless infrastructure node 102 is assigned a DHCP assigned address of a wireless control device 108 by the DHCP server 110, then the wireless infrastructure node 102 may send a discovery message to the DHCP assigned address. This process is discussed in further detail with reference to FIG. 4.

The network 100 may also include a remote management station 112, according to an example embodiment. The remote management station 112 may be coupled to the network 100, such as by a wired connection. The remote management station 112 may allow a user to monitor the wireless control devices 108. The remote management station 112 may also allow the user to statically assign, to a wireless infrastructure node 102, an address such as an Internet Protocol address of a wireless control device 108 with which the wireless infrastructure node 102 should associate. The wireless infrastructure node 102 may be statically assigned up to four addresses, according to an example embodiment.

If the wireless infrastructure node 102 is statically assigned an address of a wireless control device 108, then the wireless infrastructure node 102 may send a discovery message to the statically assigned address. This process is discussed in further detail with reference to FIG. 3. These discovery processes, with static or DHCP assignment of a wireless control device 108, as well as other processes performed by the wireless infrastructure node 102, are discussed in further detail with reference to FIG. 8.

The wireless infrastructure nodes 102 may each associate with a wireless control device 108 according to one of four protocols, according to an example embodiment. The first association by a wireless infrastructure node 102 with a wireless control device 108a may take precedence over other possible associations. Thus, once a wireless infrastructure node 102 is associated with or managed by a wireless control device 108a, the wireless infrastructure node 102 may be configured to not change its association unless the connection with the wireless control device 108a fails or the wireless infrastructure node 102 receives a message from the wireless control device 108a with which the wireless infrastructure node 102 is associated, or from another wireless control device 108b, to disassociate with the wireless control device 108a or to associate with the other wireless control device 108b, according to an example embodiment.

The four protocols may include static assignment of the wireless control device 108 address to the wireless infrastructure node 102, DHCP assignment of the wireless control device 108 address to the wireless infrastructure node 102, configuration of the wireless control device 108 with a list of addresses, and discovery of the wireless infrastructure node 102 by the wireless control device 108. An example priority scheme for the four protocols is shown in the following table:

1. Static assignment of the wireless control device 108 address to the wireless infrastructure node 102
2. DHCP assignment of the wireless control device 108 address to the wireless infrastructure node 102
3. Configuration of the wireless control device 108 with a list of addresses
4. Discovery of the wireless infrastructure node 102 by the wireless control device 108

For example, if the wireless infrastructure node 102 is statically assigned an address of a wireless control device 108, then the wireless infrastructure node 102 may send discovery messages to the statically assigned address, and may ignore any address assignment from the DHCP server 110, and may ignore discovery messages from wireless control devices 108. If the wireless infrastructure node 102 is DHCP assigned an address of a wireless control device 108, then the wireless infrastructure node 102 may send discovery messages to the DHCP assigned address, and may ignore discovery messages from wireless control devices 108. If the wireless infrastructure node 102 is not assigned an address by static assignment or DHCP assignment, then the wireless infrastructure node 102 may process discovery messages received from wireless control devices 108. The wireless infrastructure node 102 may preferentially associate with a wireless control device 108a which sends a discovery message indicating that the address of the wireless infrastructure node 102 was on a list configured in the wireless control device 108a over a wireless control device 108b which sends a discovery message which does not indicate that the address of the wireless infrastructure node 102 was on a list, according to an example embodiment.

Figure 2:
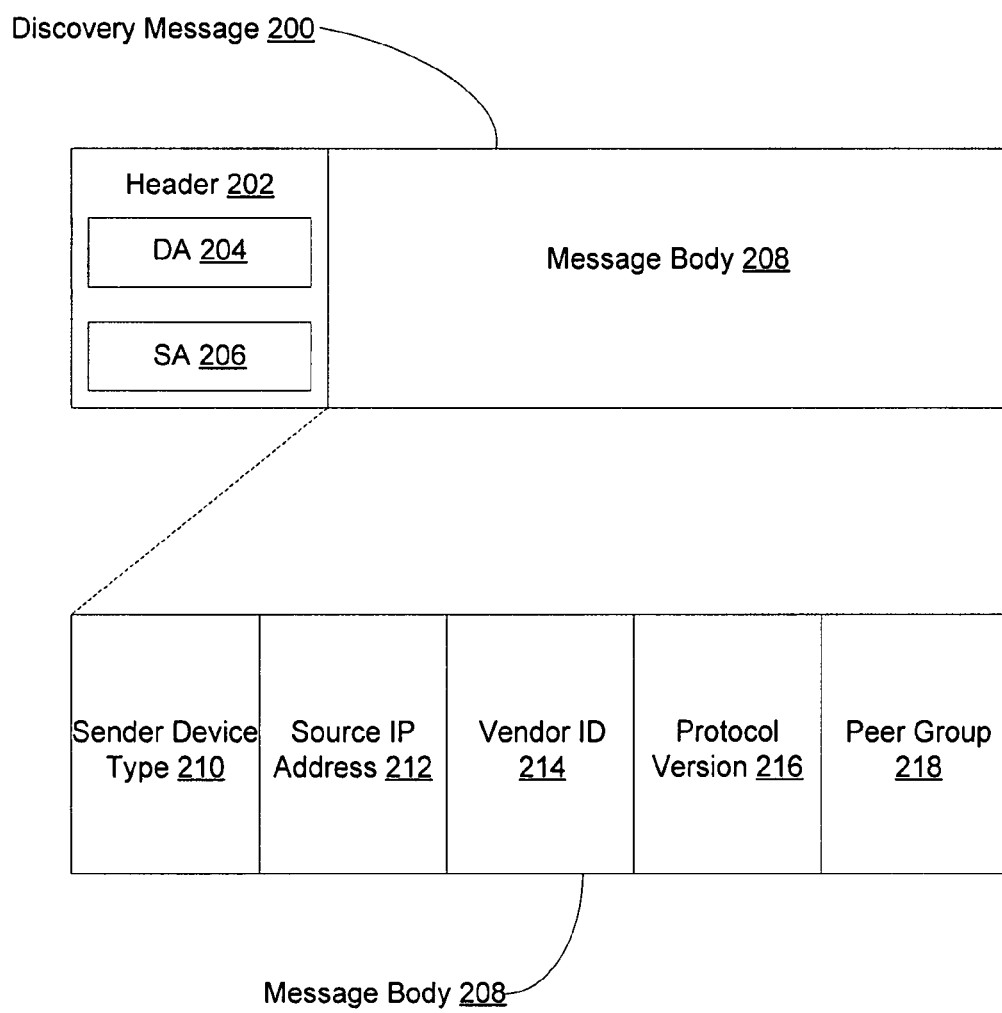
FIG. 2 is a block diagram showing a discovery message, according to an example embodiment.

FIG. 2 is a block diagram showing a discovery message 200, according to an example embodiment. The discovery message 200 may include a header 202, which may include a discovery address field 204 and a source address field 206, and a message body 208. Other fields may be included in the discovery message 200 as well, such as, for example, a virtual local area network (VLAN) identifier.

The destination address field 204 may include a destination address for the discovery message 200. The destination address field 204 may be used by other devices in the network 100 to route the discovery message 200, and may also be used by other devices to determine whether to process the discovery message 200 based on whether the discovery message is addressed to the recipient device. The destination address field 204 may include a Medium Access Control (MAC) address of the destination device, according to an example embodiment.

The source address field 204 may include a source address for the discovery message 200. The source address may indicate a source of the discovery message 200. The source address field 204 may include a MAC address of the destination device, according to an example embodiment.

The header 202 may also include other fields, such as an Ether type, a protocol ID, a message type, and/or a message length, according to an example embodiment.

The message body 208 may include a sender device type field 210, according to an example embodiment. The sender device type field 210 may, for example, include an element ID and an element length for the sender device type field 210. The sender device type field 210 may also include a sender device type. The sender device type may, for example, be either a wireless infrastructure node 102 or a wireless control device 108.

The message body 208 may also include a source IP address field 212, according to an example embodiment. The source IP address field 212 may include an IP address element ID and an IP address element length. The source IP address field 212 may also include an Internet Protocol address of the sending device. The Internet Protocol address may have been assigned to the sending device by the DHCP server 110, according to an example embodiment.

The message body 208 may also include a vendor ID address field 214, according to an example embodiment. The vendor ID address field 214 may, for example, include a vendor ID element ID and a vendor ID element length. The vendor ID address field 214 may also include a vendor ID of the sending device. The vendor ID may have been assigned to the sending device based on a request by a vendor of the manufacturer of the sending device. The vendor ID may have been requested to allow devices to interoperate only with devices authorized by the same vendor, according to an example embodiment. A generic vendor ID may be available for vendors who wish for their devices to interoperate with devices authorized by any vendor.

The message body 208 may also include a protocol version field 216, according to an example embodiment. The protocol version field 216 may, for example, include a protocol version element ID and a protocol version element length. The protocol version field 216 may also include a protocol. The protocol may identify a discovery protocol used by the sending device. The identified protocol may include the any of the four protocols listed in the above table, or may include the priority scheme of all four protocols listed in the above table.

The message body 208 may also include a peer group field 218. The peer group field 218 may, for example, include a peer group element ID and a peer group element length. The peer group field 218 may also include a peer group ID. The peer group ID may include a peer group associated with a wireless control device 108, of which the sending device is a member.

Figure 3:
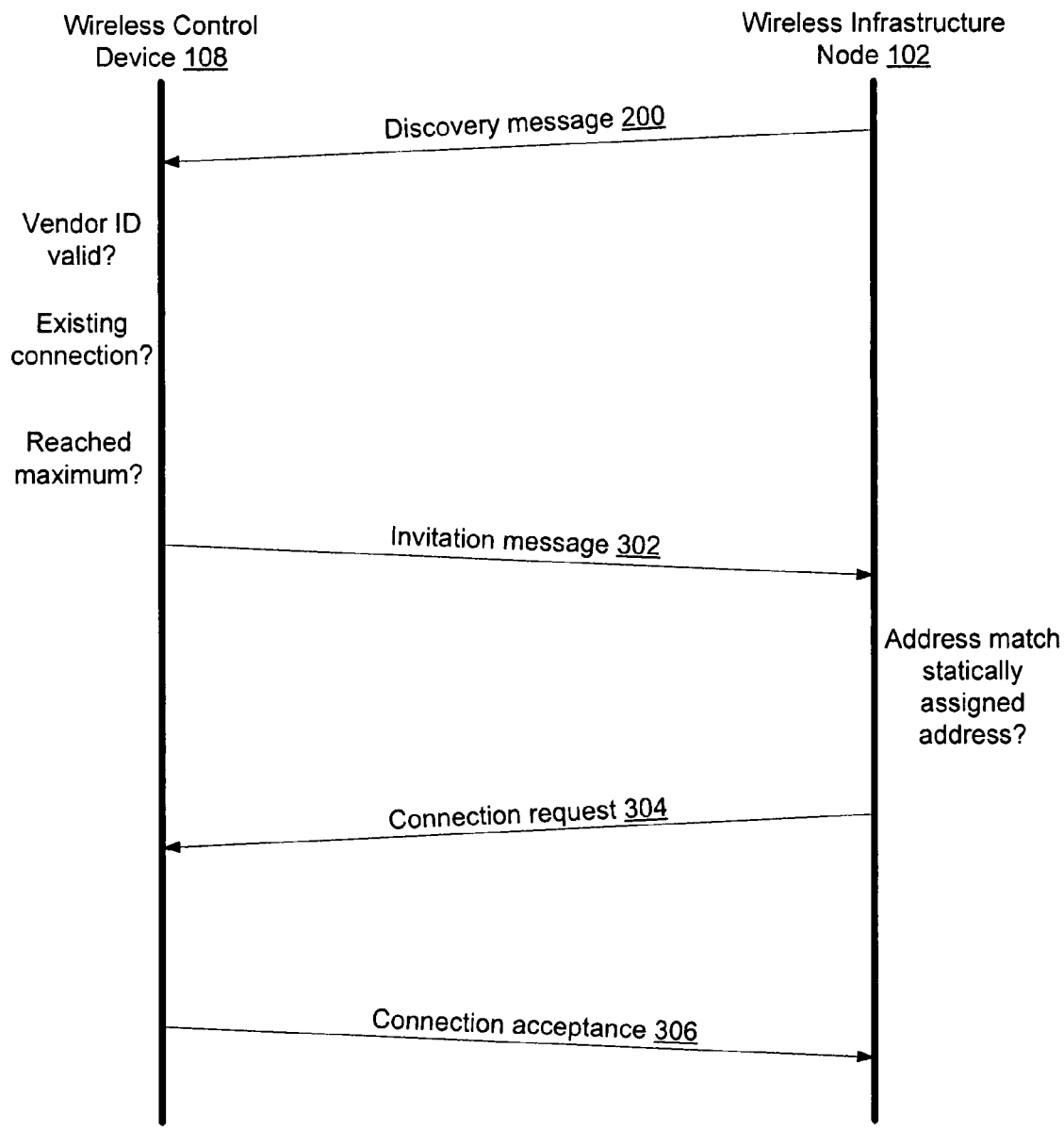
FIG. 3 is a diagram showing messages sent between a wireless control device and a wireless infrastructure node when an address of the wireless control device is statically assigned to the wireless infrastructure node, according to an example embodiment.

FIG. 3 is a diagram showing messages sent between a wireless control device 108 and a wireless infrastructure node 102 when an address of the wireless control device 108 is statically assigned to the wireless infrastructure node 102, according to an example embodiment. According to this example, the wireless infrastructure node 102 may determine that it is not being managed by a wireless control device 108, and may send a discovery message 200 to the wireless control device 108 associated with the statically assigned address. The discovery message 200 may, for example, be sent to the statically assigned address according to the Uniform Datagram Protocol. The statically assigned address to which the discovery message 200 may be sent may be an Internet Protocol address, or may be a Domain Name System name, according to an example embodiment. According to this example, a user may statically assign either 192.268.77.127 or ws2.lvl7.com as the address.

According to one example embodiment, the wireless infrastructure node 102 with a statically assigned address may send the discovery message 200 to the statically assigned address over the network 100 periodically, such as every thirty seconds. According to an example in which the wireless infrastructure node 102 is statically assigned a plurality of addresses, the wireless infrastructure node 102 may wait, such as for five seconds, before sending a discovery message 200 to a subsequent address.

The wireless control device 108 may receive the discovery message 200. In response to receiving the discovery message 200, the wireless control device 108 may, for example, determine whether a vendor ID of the wireless infrastructure node 102 is valid by comparing the vendor ID in the vendor ID field 214 of the discovery message 200 to a vendor ID of the wireless control device 108. The vendor ID of the wireless control device may, for example, be stored in a memory of the wireless control device 108.

The wireless control device 108 may also determine whether the wireless control device 108 already has an existing connection with the wireless infrastructure node 102, and may determine whether the wireless control device 108 has already reached a maximum number of managed wireless infrastructure nodes 102. If the wireless control device 108 determines that the vendor ID is valid (e.g., the vendor ID in the discovery message matches the vendor ID of the receiving wireless control device 108), that the wireless control device 108 does not already have an existing connection with the wireless infrastructure node 102, and that the wireless control device has not reached a maximum number of managed wireless infrastructure nodes 102, then the wireless control device 108 may send an invitation message 302 to the wireless infrastructure node 102, for example. The wireless control device 108 may respond to receipt of multiple discovery messages 200 from the same wireless infrastructure node 102 by making the above-described determinations and sending the invitation message 302, because the discovery message 200 may be unreliable when sent in Uniform Datagram Protocol format.

The wireless infrastructure node 102 may respond to receipt of the invitation message 302 by determining whether an address of the wireless control device 108, included in the invitation message 302, matches an address statically assigned to the wireless infrastructure node 102. The wireless infrastructure node 102 may determine whether the address of the wireless control device 108 matches the address statically assigned to the wireless infrastructure node 102 by, for example, consulting a memory of the wireless infrastructure node 102. If the addresses match, then the wireless infrastructure node 102 may send a connection request 304 to the wireless control device 108. The connection request 304 may, for example, include a secure sockets layer (SSL) transport control protocol (TCP) connection request. The wireless control device 108 may respond to receiving the connection request 304 by sending a connection acceptance 306, such as a secure sockets layer transport control protocol connection acceptance 306, to the wireless infrastructure node 102. The wireless control device 108 and the wireless infrastructure node 102 may thereby establish a connection with the wireless control device 108 managing the wireless infrastructure node 102, according to an example embodiment.

Figure 4:
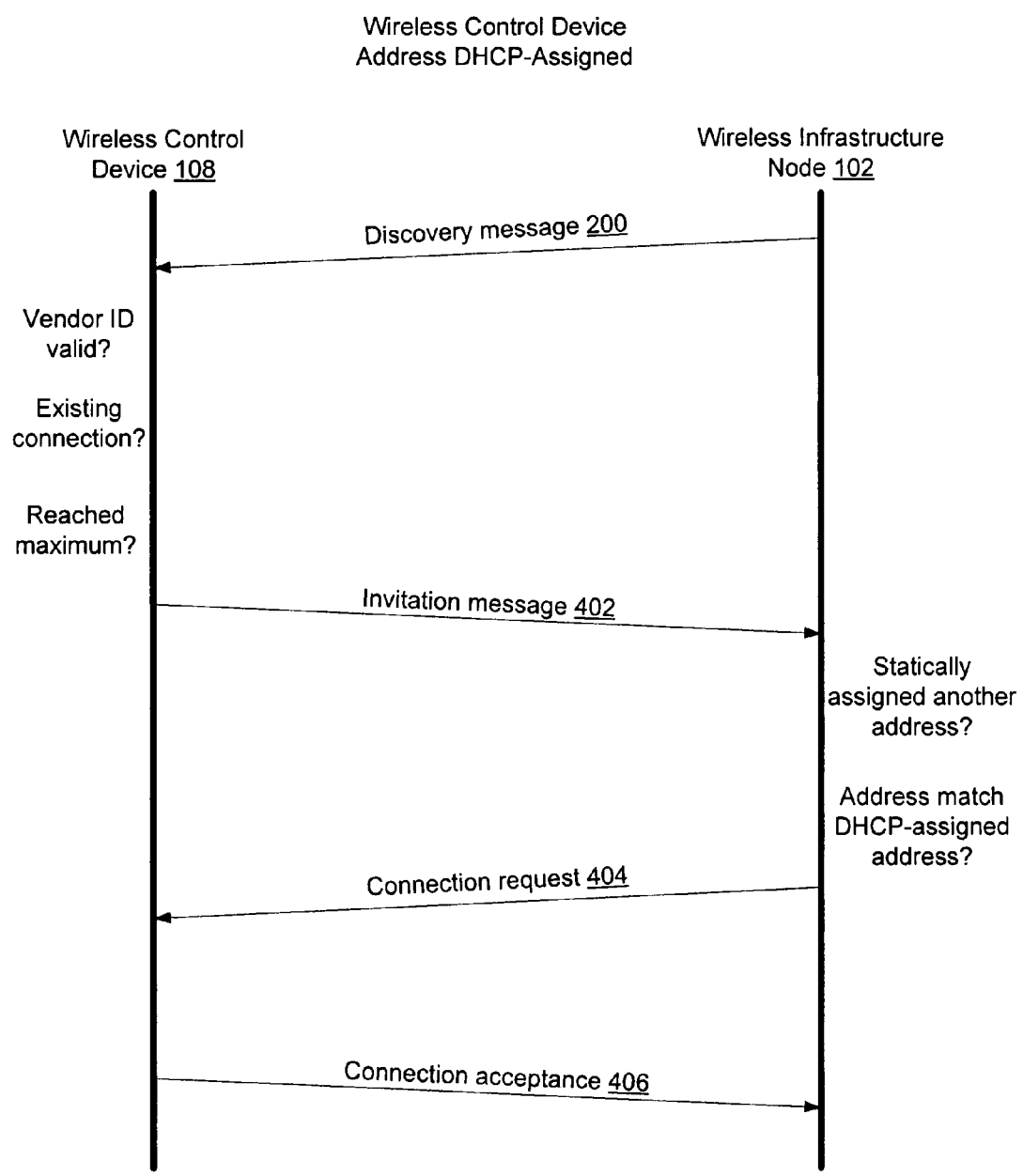
FIG. 4 is a diagram showing messages sent between the wireless control device and the wireless infrastructure node when the address of the wireless control device is assigned to the wireless infrastructure node by a DHCP server, according to an example embodiment.

FIG. 4 is a diagram showing messages sent between the wireless control device 108 and the wireless infrastructure node 102 when the address of the wireless control device 108 is assigned to the wireless infrastructure node 102 by a DHCP server 110, according to an example embodiment. This process of establishing a connection when the address of the wireless control device 108 is assigned to the wireless infrastructure node 102 by the DHCP server 110 shown in FIG. 4 is similar to the process of establishing the connection when the address of the wireless control device 108 is statically assigned to the wireless infrastructure node 102.

According to this example, the wireless infrastructure node 102 may determine that it is not being managed by a wireless control device 108, and may send the discovery message 200 to the wireless control device 108 associated with the DHCP assigned address. The discovery message 200 may, for example, be sent to the statically assigned address according to the Uniform Datagram Protocol. The statically assigned address to which the discovery message 200 may be sent may be an Internet Protocol address, or may be a Domain Name System name, according to an example embodiment.

According to the example shown in FIG. 4, the wireless infrastructure node 102 with a DHCP assigned address may send the discovery message 200 over the network 100 periodically, such as every thirty seconds. According to an example in which the wireless infrastructure node 102 is assigned a plurality of addresses by the DHCP server 110, the wireless infrastructure node 102 may wait, such as for five seconds (or other period), before sending a discovery message 200 to a subsequent address.

The wireless control device 108 may receive the discovery message 200. In response to receiving the discovery message 200, the wireless control device 108 may, for example, determine whether a vendor ID of the wireless infrastructure node 102 is valid, whether the wireless control device 108 already has an existing connection with the wireless infrastructure node 102, and/or whether the wireless control device 108 has already reached a maximum number of managed wireless infrastructure nodes 102, as described above with reference to FIG. 3.

In an example embodiment, if the wireless control device 108 determines that the vendor ID is valid (or is a match), that the wireless control device 108 does not already have an existing connection with the wireless infrastructure node 102, and that the wireless control device has not reached a maximum number of managed wireless infrastructure nodes 102, then the wireless control device 108 may send an invitation message 402 to the wireless infrastructure node 102. The wireless control device 108 may respond to receipt of multiple discovery messages 200 from the same wireless infrastructure node 102 by making the above-described determinations and sending the invitation message 402 due to unreliability of the discovery message 200 sent in Uniform Datagram Protocol (UDP) format.

The wireless infrastructure node 102 may respond to receipt of the invitation message 402 by determining whether the wireless infrastructure node 102 has been statically assigned an address other than the address of the wireless control device 108 (included in the invitation message 402), and whether the address of the wireless control device 108 matches an address that the DHCP server 110 assigned to the wireless infrastructure node 102. The wireless infrastructure node 102 may make these determinations by, for example consulting a memory of the wireless infrastructure node 102.

If the wireless infrastructure node 102 determines that it has not been statically assigned another address, and that the address of the wireless control device 108 matches the DHCP assigned address, then the wireless infrastructure node 102 may send a connection request 404 to the wireless control device 108. The connection request 404 may, for example, include a secure sockets layer transport control protocol connection request. The wireless control device 108 may respond to receiving the connection request 404 by sending a connection acceptance 406, such as a secure sockets layer transport control protocol connection acceptance 406, to the wireless infrastructure node 102. The wireless control device 108 and the wireless infrastructure node 102 may thereby establish a connection with the wireless control device 108 managing the wireless infrastructure node 102, according to an example embodiment.

Figure 5:
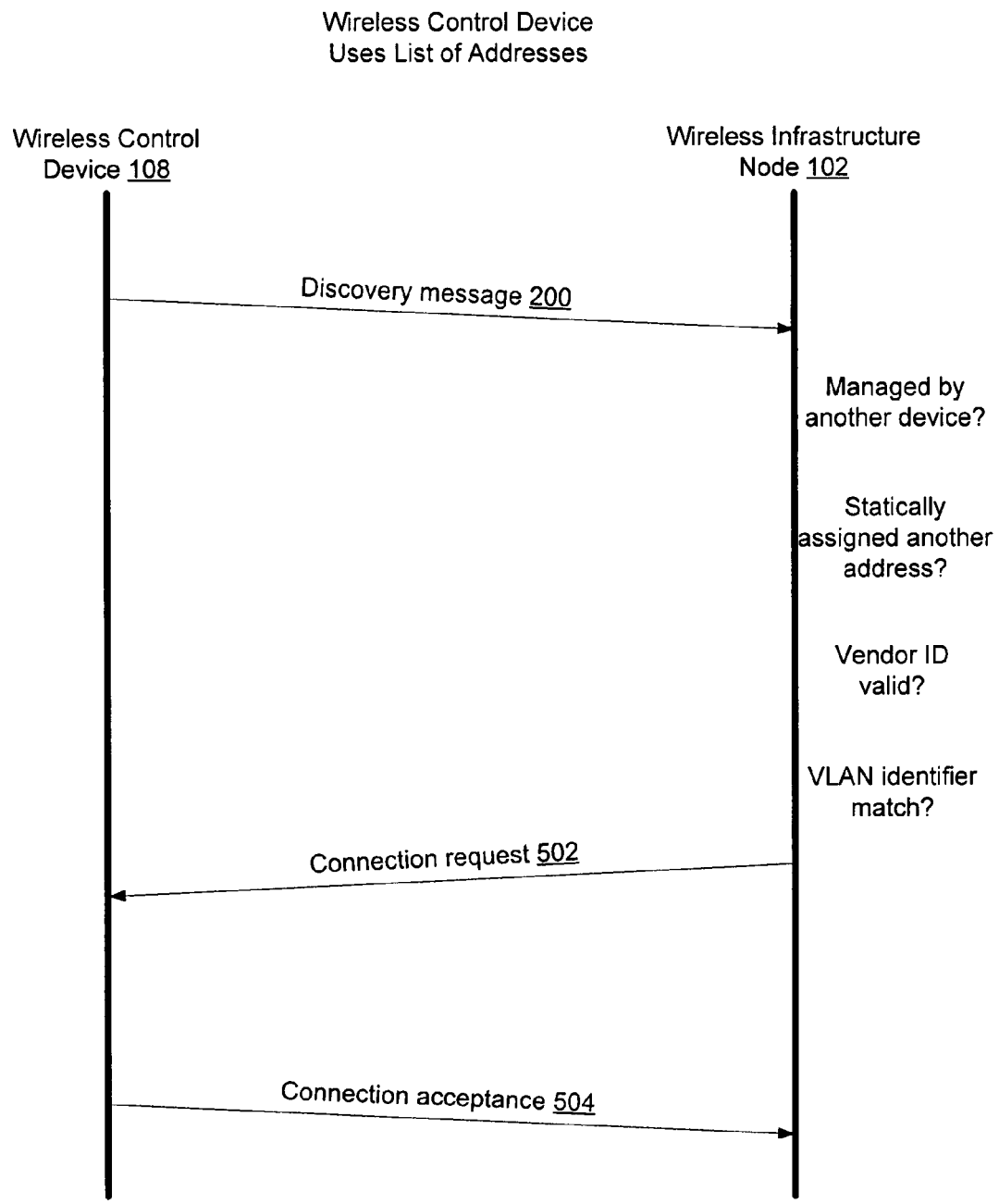
FIG. 5 is a diagram showing messages sent between the wireless control device and the wireless infrastructure node when the wireless control device sends discovery messages to a list of addresses, according to an example embodiment.

FIG. 5 is a diagram showing messages sent between the wireless control device 108 and the wireless infrastructure node 102 when the wireless control device 108 sends discovery messages 200 to a list of addresses, according to an example embodiment. According to this example, the wireless control device 108 may be configured with a plurality of addresses, such as Internet Protocol addresses, for potential managed wireless infrastructure nodes 102 and peer wireless control devices 108. The wireless control device 108 may periodically send a discovery message 200 to each address in the list. The discovery message 200 in this example may include data causing the discovery message 200 to be treated as a connection invitation; these data may be included in the message body 208, according to an example embodiment.

The wireless control device 108 may, for example, periodically send the discovery message 200 to every address on its list, such as every thirty seconds. The discovery message 200 may include a user datagram protocol segment, according to an example embodiment. The wireless control device 108 may determine, for each address on the list, whether the wireless control device 108 has an existing connection with the address, and if not, send the discovery message 200 to the address. The discovery message 200 may be sent to the address according to the user datagram protocol, according to an example embodiment. To determine whether the address is present on the network 100, the wireless control device 108 may send a broadcast packet to the network 100 requesting a response from the owner of the address using the address resolution protocol, according to an example embodiment. If a predetermined number of address resolution protocol attempts time out, then the wireless control device may move on to the next address on the list.

Upon receipt of the discovery message 200, the wireless infrastructure node 102 may determine whether the wireless infrastructure node 102 is already being managed by a wireless control device 108, whether the wireless infrastructure node 102 is statically assigned to an address other than the address of the wireless control device 108 (which may be communicated by the source IP address included in the source IP address field 212 of the discovery message 200), whether a vendor ID included in the vendor ID field 214 of the discovery message 200 matches the vendor ID of the wireless infrastructure node 102, and whether a virtual local area network identifier included in the discovery message matches a virtual local area network of the wireless infrastructure node 102.

If the wireless infrastructure node 102 determines that the wireless infrastructure node 102 is not already being managed by a wireless control device 108, that the wireless infrastructure node 102 is not statically assigned to an address other than the source IP address included in the source IP address field 212 of the discovery message 200, that the vendor ID included in the vendor ID field 214 of the discovery message 200 matches the vendor ID of the wireless infrastructure node 102, and that the virtual local area network identifier included in the discovery message matches the virtual local area network of the wireless infrastructure node 102, then the wireless infrastructure node 102 may send a connection request 502 to the wireless control device 108. Otherwise, the wireless infrastructure node 102 may ignore the discovery message 200.

The connection request 502 may, for example, include a secure sockets layer transport control protocol connection request. Upon receipt of the connection request 502, the wireless control device 108 may send a connection acceptance 504 to the wireless infrastructure node 102, and a connection may be established between the wireless control device 108 and the wireless infrastructure node 102.

Figure 6:
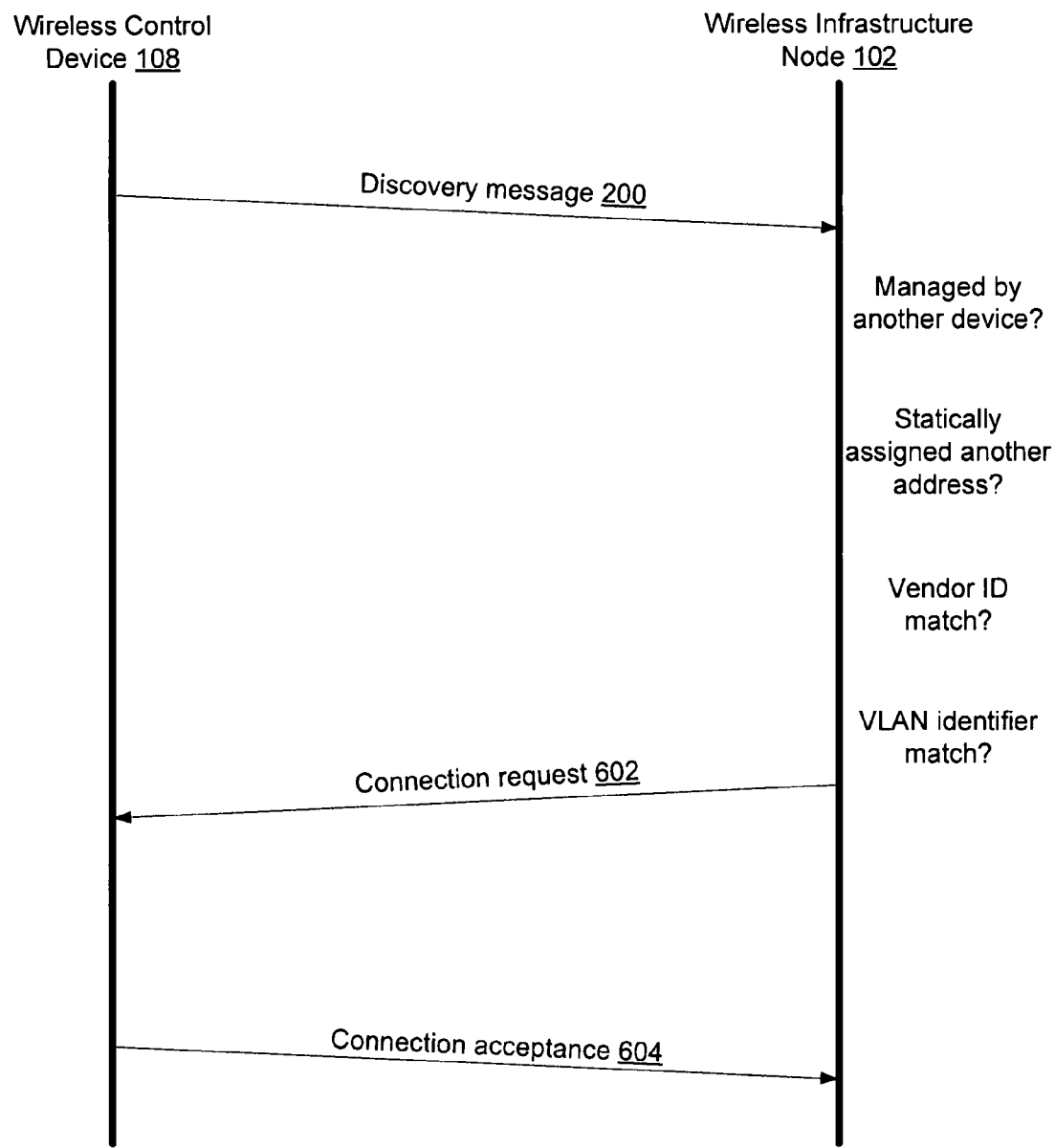
FIG. 6 is a diagram showing messages sent between the wireless control device and the wireless infrastructure node when the wireless control device engages in a discovery protocol, according to an example embodiment.

FIG. 6 is a diagram showing messages sent between the wireless control device 108 and the wireless infrastructure node 102 when the wireless control device 102 engages in a discovery protocol, according to an example embodiment. According to this example, the wireless control device 108 may send the discovery message 200 to the wireless infrastructure node 102. This discovery message 200 may be sent as an Ethernet frame. The discovery message 200 may also be sent to the network 100 as a multicast frame, in which example the discovery message 200 may be read and responded to by all devices which receive the discovery message 200. The wireless control device 108 may send the discovery message 200 periodically, according to an example embodiment.

Upon receipt of the discovery message 200, the wireless infrastructure node 102 may determine whether the wireless infrastructure node 102 is already being managed by a wireless control device 108, whether the wireless infrastructure node 102 is statically assigned to an address other than the address of the wireless control device 108, whether a vendor ID included in the vendor ID field 214 of the discovery message 200 matches the vendor ID of the wireless infrastructure node 102, and whether a virtual local area network identifier included in the discovery message matches a virtual local area network of the wireless infrastructure node 102.

If the wireless infrastructure node 102 determines that the wireless infrastructure node 102 is not already being managed by a wireless control device 108, that the wireless infrastructure node 102 is not statically assigned to an address other than the source IP address included in the source IP address field 212 of the discovery message 200, that the vendor ID included in the vendor ID field 214 of the discovery message 200 matches the vendor ID of the wireless infrastructure node 102, and that the virtual local area network identifier included in the discovery message 200 matches the virtual local area network of the wireless infrastructure node 102, then the wireless infrastructure node 102 may send a connection request 602 to the wireless control device 108. Otherwise, the wireless infrastructure node 102 may ignore the discovery message 200.

The connection request 602 may include a secure sockets layer transport control protocol connection request. Upon receipt of the connection request 602, the wireless control device 108 may send a connection acceptance 604 to the wireless infrastructure node 102, and a connection may be established between the wireless control device 108 and the wireless infrastructure node 102.

Figure 7:
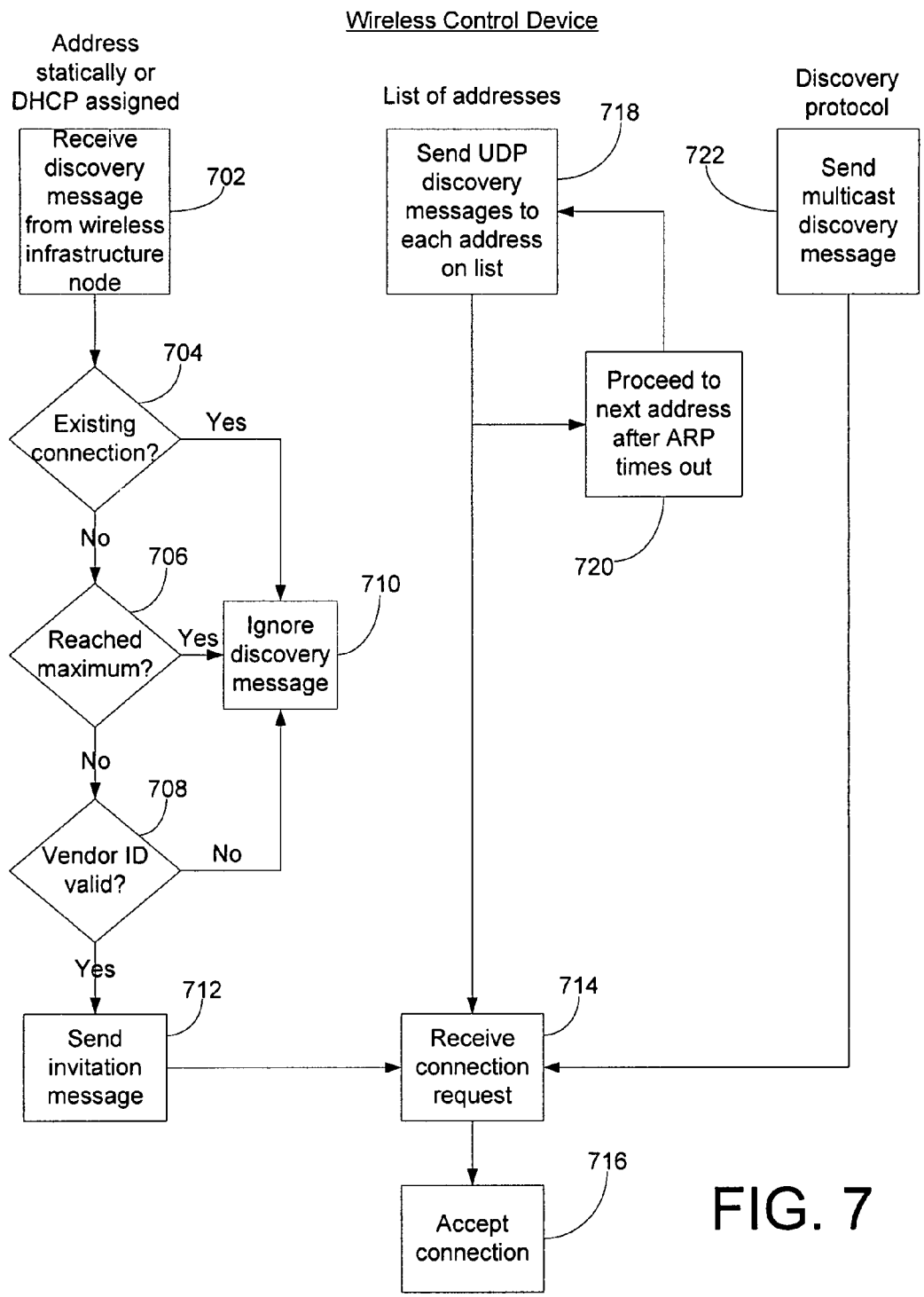
FIG. 7 is a flowchart showing processes performed by the wireless control device, according to an example embodiment.

FIG. 7 is a flowchart showing processes performed by the wireless control device 108, according to an example embodiment. If the address of the wireless control device 108 is statically or DHCP assigned to the wireless infrastructure node 102, then the wireless control device 108 may receive a discovery message 200 from the wireless infrastructure node 102 (702). Upon receipt of the discovery message 20 from the wireless infrastructure node 102, the wireless control device 108 may determine whether the wireless control device 108 already has an existing connection with the wireless infrastructure node 102 (704), whether the wireless control device 108 has reached a maximum number of managed wireless infrastructure nodes 102 (706), and whether a vendor ID of the wireless infrastructure node 102 (which may be included in the vendor ID field 214 of the discovery message 200) is valid (708). If the wireless control device 108 already has an existing connection with the wireless infrastructure node 102, or the wireless control device 108 has reached a maximum number of managed wireless infrastructure nodes 102, or the vendor ID is not valid, then the wireless control device 108 may ignore the discovery message 200 (710).

If the wireless control device 108 does not already have an existing connection with the wireless infrastructure node 102 that sent the discovery message 200, the wireless control device 108 has not reached a maximum number of managed wireless infrastructure nodes 102, and the vendor ID is valid, then the wireless control device 108 may send an invitation message 302, 402 to the wireless infrastructure node 102. The wireless control device 108 may receive a connection request 304, 404 (714) from the wireless infrastructure node 102, and may respond to the connection request 304, 404 by accepting the connection (716), such as by sending a connection acceptance 306, 406 to the wireless infrastructure node 102.

If the wireless control device 108 is configured with a list of addresses, then the wireless control device 108 may send discovery messages 200, such as user datagram protocol segments, to each address on the list (718). The wireless control device 108 may engage in address resolution protocol for each address; if the wireless control device 108 does not receive a response to the discovery message 200, then the wireless control device 108 may proceed to the next address after the address resolution protocol times out (720).

The wireless control device 108 may receive a connection request 502 from the wireless infrastructure node 102. The wireless control device 108 may respond to the connection request 502 by accepting the connection (716), such as by sending a connection acceptance 504 to the wireless infrastructure node 102.

If the wireless control device 108 is not configured with a list of addresses, then the wireless control device 108 may engage in a discovery protocol by sending a multicast discovery message 200 (722) to each device in the network 100. The wireless control device 108 may receive a connection request 602 (714) from a wireless infrastructure node 102, and may respond to the connection request 602 by accepting the connection (716), such as by sending a connection acceptance 604 to the wireless infrastructure node 102.

Figure 8:
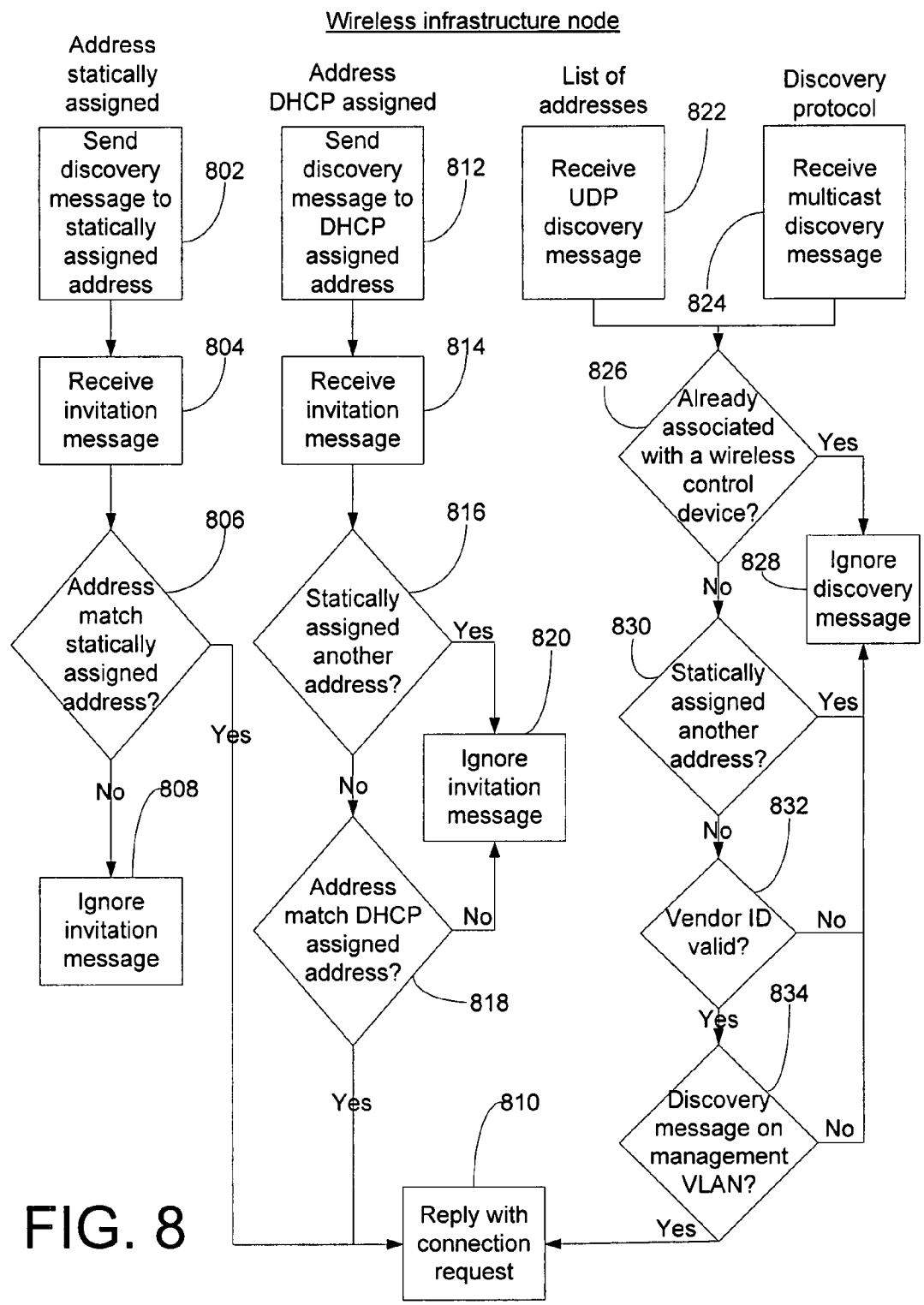
FIG. 8 is a flowchart showing processes performed by the wireless infrastructure node, according to an example embodiment.

FIG. 8 is a flowchart showing processes performed by the wireless infrastructure node 102, according to an example embodiment. If the wireless infrastructure node 102 is statically assigned an address of a wireless control device 108, such as by the remote management station 112, then the wireless infrastructure node 102 may send a discovery message 200 to the statically assigned address (802). The wireless infrastructure node 102 may receive an invitation message 302 (804) from the wireless control device 108. Upon receiving the invitation message 302, the wireless infrastructure node 102 may determine whether an address of the wireless control device 108, which may be included in the invitation message 302, matches the statically assigned address (806). If the address of the wireless control device 108 does not match the statically assigned address, then the wireless infrastructure node 102 may ignore the invitation message 302 (808). If the address of the wireless control device 108 does match the statically assigned address, then the wireless infrastructure node 102 may reply to the invitation message 302 with a connection request 304 (810).

If the wireless infrastructure node 102 is assigned an address of a wireless control device 108 by the DHCP server 110, then the wireless infrastructure node 102 may send a discovery message 200 to the DHCP assigned address (812). The wireless infrastructure node 102 may receive an invitation message 402 from the wireless control device 108 (814). In response to receiving the invitation message 402, the wireless infrastructure node 102 may determine whether the wireless infrastructure node 102 has been statically assigned an address other than the address of the wireless control device 108 which sent the invitation message 402 (816), and may determine whether the address of the wireless control device 108 matches the DHCP assigned address (818). If the wireless infrastructure node 102 has been statically assigned another address, or if the address does not match the DHCP assigned address, then the wireless infrastructure node 102 may ignore the invitation message 402 (820). If the wireless infrastructure node 102 has not been statically assigned another address, and the address matches the DHCP assigned address, then the wireless infrastructure node 102 may reply to the invitation message 402 with a connection request (810).

The wireless infrastructure node 102 may receive a discovery message 200 including at least one user datagram protocol segment (822) from a wireless control device 108 which is configured with a list of addresses, or may receive a multicast discovery message 200 (824) from a wireless control device 108 which is not configured with a list of addresses. In response to receiving the discovery message 200, the wireless infrastructure node 102 may determine whether the wireless infrastructure node 102 is already associated with or being managed by another wireless control device 108 (826), whether the wireless infrastructure node 102 has been statically assigned an address other than the address of the wireless control device 108 which sent the discovery message 200 (828), whether a vendor ID included in the discovery message 200 is valid (830) or matches a vendor ID of the wireless infrastructure node 102, and whether the discovery message 200 was sent on the management virtual local area network (832) of the wireless infrastructure node 102, according to an example embodiment.

If the wireless infrastructure node 102 is already associated with a wireless control device 108, or is statically assigned another address, or if the vendor ID included in the discovery message 200 is invalid, or the discovery message 200 was not sent on the management virtual area network, then the wireless infrastructure node 102 may ignore the discovery message 200 (834). If the wireless infrastructure node 102 is not already associated with a wireless control device 108, the wireless infrastructure node 102 is not statically assigned another address, the vendor ID is valid, and the discovery message is sent on the management virtual area network, then the wireless infrastructure node may reply to the discovery message 200 with a connection request 502, 602 (810).

Figure 9:
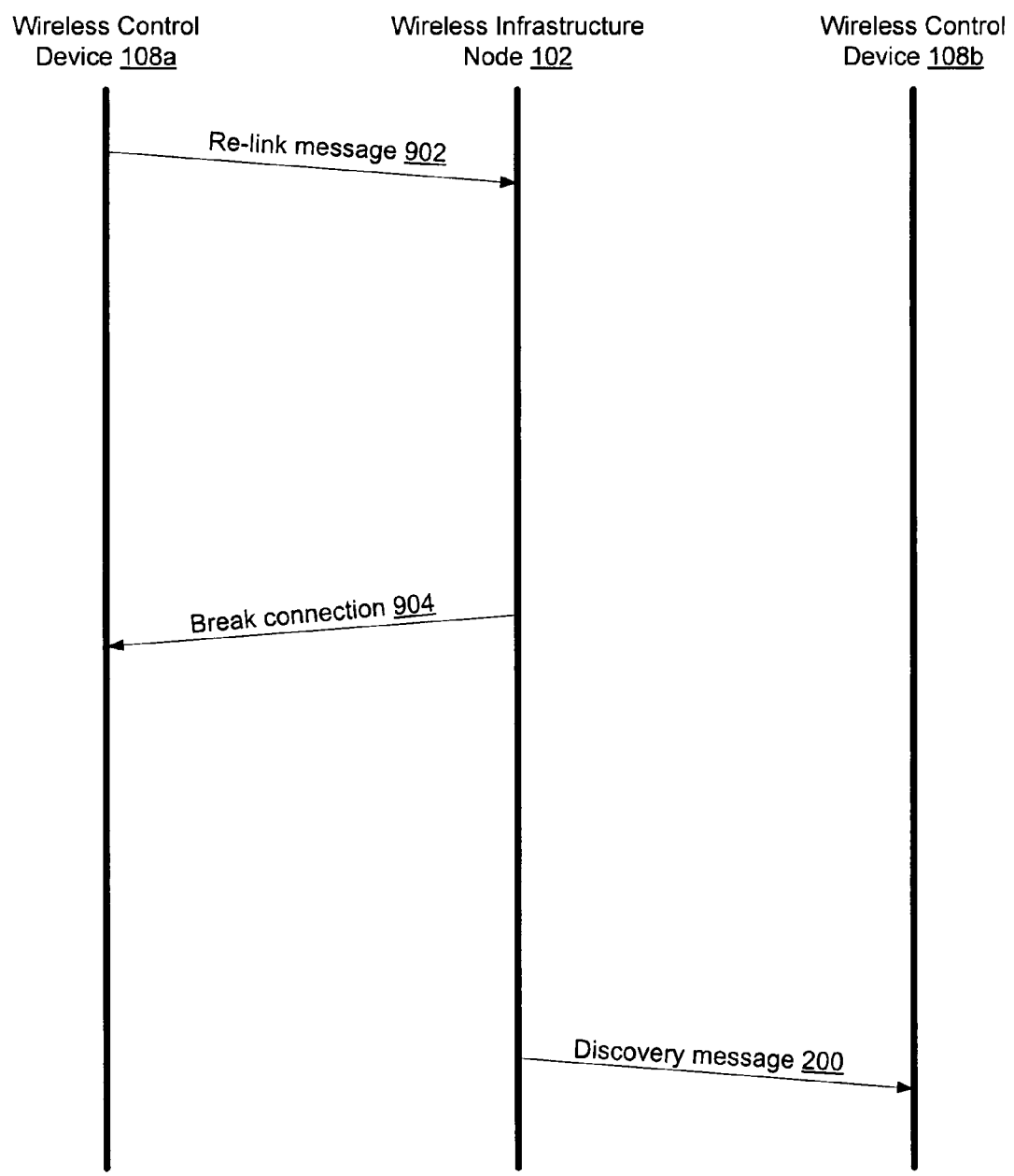
FIG. 9 is a diagram showing messages sent between a first wireless control device, a wireless infrastructure node, and a second wireless control device when the first wireless control device sends a re-link message to the wireless infrastructure node, according to an example embodiment.

FIG. 9 is a diagram showing messages sent between a first wireless control device 108*a*, a wireless infrastructure node 102, and a second wireless control device 108*b* when the first wireless control device 108*a* sends a re-link message 902 to the wireless infrastructure node 102, according to an example embodiment. In this example, the wireless infrastructure node 102 may have already been managed by or associated with the first wireless control device 108*a* before receiving the re-link message 902.

In an example embodiment, a server, such as a RADIUS server (not shown) may determine that the wireless infrastructure node 102 should associate with the second wireless control device 108*b* instead of the first wireless control device 108*a*, and instruct the first wireless control device 108*a* accordingly. The first wireless control device 108*a* may send a re-link message 902 to the wireless infrastructure node 102; the re-link message 902 may include an address of the second wireless control device 108*b*. In response to receiving the re-link message 902, the wireless infrastructure node 102 may break the connection 904 with the first wireless control device 108*a*. The wireless infrastructure node 102 may also send a discovery message 200 to the address of the second wireless control device 108*b*.

FIG. 10 is a diagram showing messages sent between the first wireless control device 108a and the second wireless control device 108b when the first wireless control device 108a invites the second wireless device 108b to join a peer group of the first wireless control device 108a, according to an example embodiment. In this example, the first wireless control device 108a may send a discovery message 200 to the second wireless control device 108b. The discovery message 200 may include an address, such as an Internet Protocol address, of the first wireless control device 108a. The second wireless control device 108b may compare the address to of the first wireless control device 108a to the address of the second wireless control device 108b, and may determine which wireless control device 108a, 108b should initiate a connection based on the comparing. For example, the second wireless control device 108b may determine that the wireless control device 108a, 108b with either the higher or lower address number should initiate the connection.

If the second wireless control device 108b determines that the second wireless control device 108b should initiate the connection, then the second wireless control device 108b may send a connection request 1002 to the first wireless control device 108. According to an example embodiment, the connection request 1004 may include a Transmission Control Protocol connection request.

According to an example embodiment, the second wireless control device 108b may determine if the first wireless control device 108a is a member of a peer group with the second wireless control device 108b, and may ignore the discovery message 200 if the first wireless control device 108a is not a member of the peer group with the second wireless control device 108b. According to another example embodiment, the second wireless control device 108b may notify the first wireless control device 108a of wireless infrastructure nodes 102 managed by the second wireless control device 108b.

Figure 11:
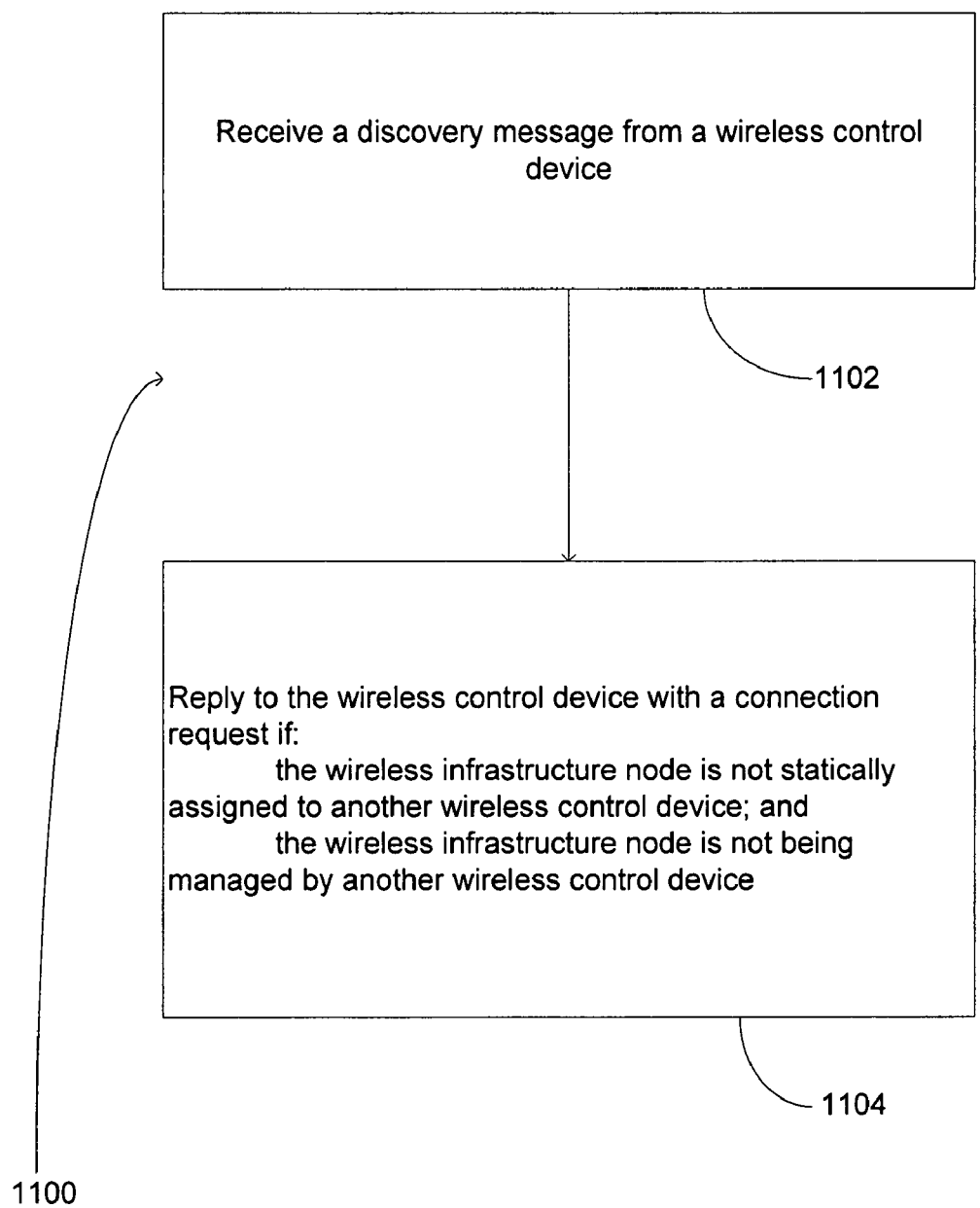
FIG. 11 is a flowchart showing a method taken by a wireless infrastructure node, according to an example embodiment.

FIG. 11 is a flowchart showing a method 1100 taken by a wireless infrastructure node 102, according to an example embodiment. The wireless infrastructure node 102 may be configured to perform the processes shown in this method 1100.

The wireless infrastructure node 102 may receive a discovery message 200 from a wireless control device 108 (1102), according to an example embodiment. The discovery message 200 may be an Ethernet frame, a multicast frame, or a user datagram segment, and may include an address of the wireless control device 108, such as an Internet Protocol address of the wireless control device 108.

The wireless infrastructure node 102 may reply to the wireless control device 108 with a connection request 502, 602 if the wireless infrastructure node 102 is not statically assigned to another wireless control device 108, and the wireless infrastructure node 102 is not being managed by another wireless control device 108 (1104), according to an example embodiment. Other conditions for the reply may include a vendor identification included in the discovery message 200 matching a vendor identification of the wireless infrastructure node 102 and/or a virtual local area network identifier included in the discovery message 200 matching a virtual local area network identifier of the wireless infrastructure node 102. The connection request 502, 602 may also include an Internet Protocol address of the wireless infrastructure node 102 and/or a request for a secure connection, according to example embodiments.

According to another example embodiment, the wireless infrastructure node 102 may also be configured to send an addressed discovery message 200 to the wireless control device 108, and to send the connection request 304, 404 to the wireless control device 108 in response to receiving an invitation message 302, 404 from the wireless control device. The addressed discovery message 200 may be sent periodically, for example.

According to another example embodiment, the wireless infrastructure node 102 may also be configured to receive an address of the wireless control device 108 from a DHCP server 110, send a discovery message 200 to the address of the wireless control device 108, and send the connection request 404 to the wireless control device 108 in response to receiving an invitation message 402 from the wireless control device 108.

Figure 12:
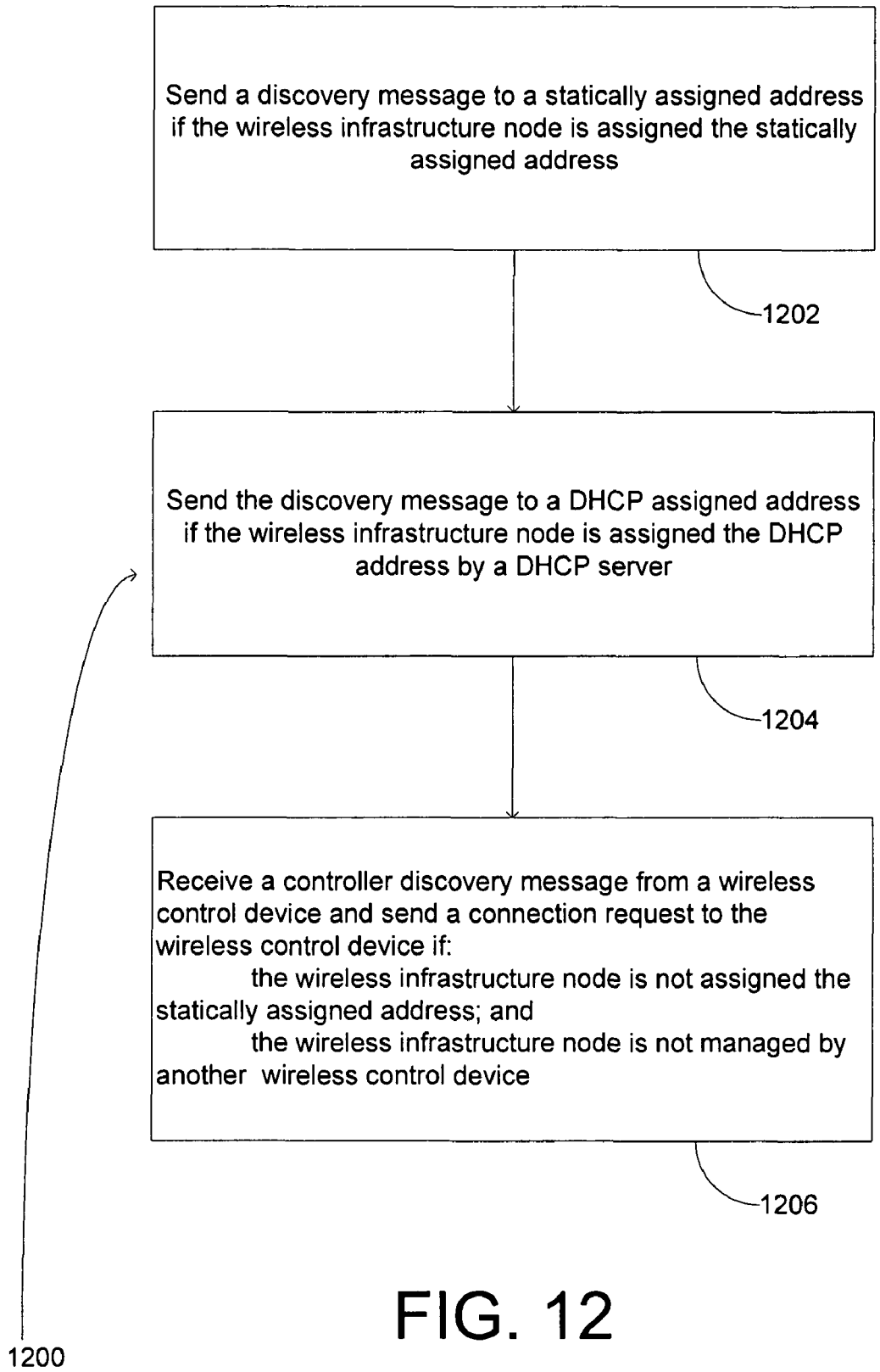
FIG. 12 is a flowchart showing another method taken by the wireless infrastructure node, according to an example embodiment.

FIG. 12 is a flowchart showing another method 1200 taken by the wireless infrastructure node 102, according to an example embodiment. The wireless infrastructure node 102 may be configured to perform the processes shown in this method 1200.

According to an example embodiment, the wireless infrastructure node 102 may send a discovery message 200 to a statically assigned address if the wireless infrastructure node 102 is assigned the statically assigned address (1202). The discovery message 200 may include at least one user datagram protocol segment. The wireless infrastructure node 102 may send the discovery message 200 to the statically assigned address periodically, for example. The wireless infrastructure node 102 may, for example, have been statically assigned the address by a remote management station 112. The wireless infrastructure node 102 may also ignore a DHCP assigned address if the wireless infrastructure node 102 is statically assigned the statically assigned address.

The wireless infrastructure node 102 may also send the discovery message 200 to a DHCP assigned address if the wireless infrastructure node 102 is assigned the DHCP assigned address by a DHCP server 110 (1204). The wireless infrastructure node 102 may send the discovery message 200 to the DHCP assigned address periodically, for example.

The wireless infrastructure node 102 may also receive a controller discovery message 200 from a wireless control device 108 and send a connection request 502, 602 to the wireless control device 108 if the wireless infrastructure node 102 is not assigned the statically assigned address and the wireless infrastructure node 102 is not managed by another wireless control device 108 (1206).

Figure 13:
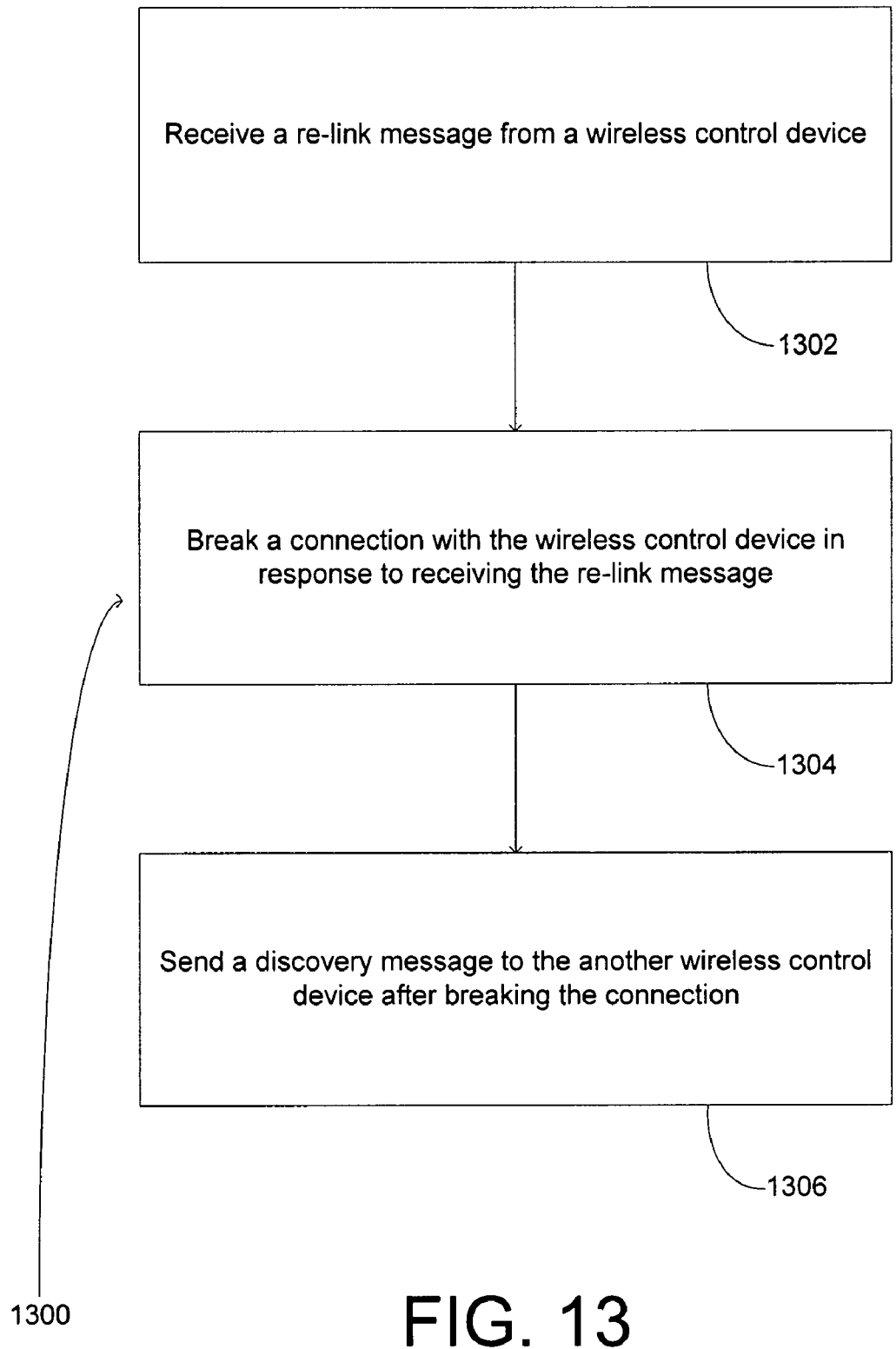
FIG. 13 is a flowchart showing another method taken by the wireless infrastructure node, according to an example embodiment.

FIG. 13 is a flowchart showing another method 1300 taken by the wireless infrastructure node 102, according to an example embodiment. The wireless infrastructure node 102 may be configured to perform the processes of this method 1300.

According to this example, the wireless infrastructure node 102 may receive a re-link message 902 from a wireless control device 108a (1302), break the connection 904 with the wireless control device 108a in response to receiving the re-link message 902 (1304), and send a discovery message 200 to another wireless control device 108b after breaking the connection (1306). According to an example embodiment, the re-link message 902 may include an address of the another wireless control device 108b, and the discovery message 200 may include the address.

Figure 14:
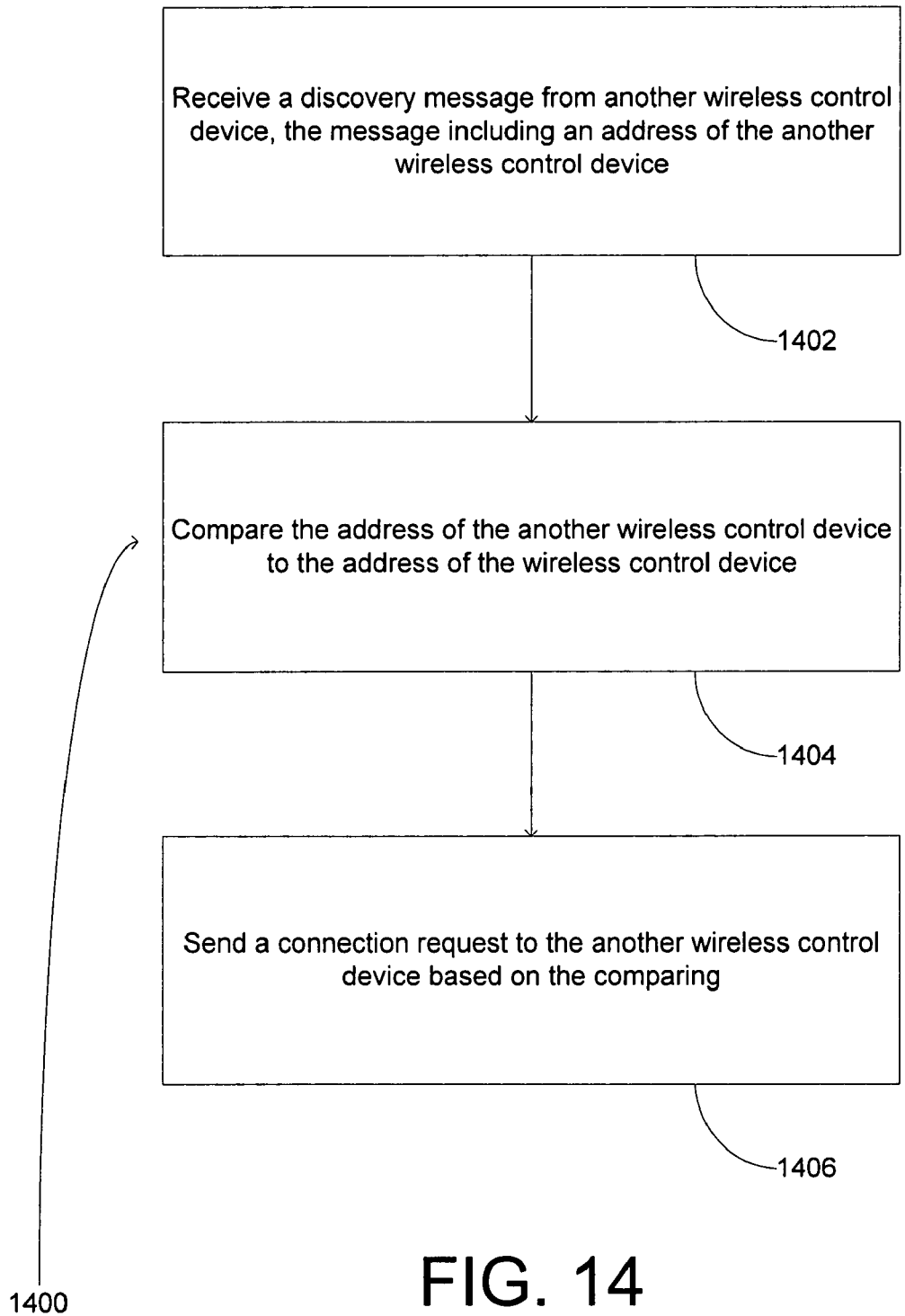
FIG. 14 is a flowchart showing a method taken by a wireless control device, according to an example embodiment.

FIG. 14 is a flowchart showing a method 1400 taken by a wireless control device 108b, according to an example embodiment. The wireless control device 108b may be configured to perform the processes of this method 1400.

According to this example, the wireless control device 108b may receive a discovery message 200 from another wireless control device 108a, and the discovery message 200 may include an address of the another wireless control device 108a (1402). The wireless control device 108b may compare the address of the another wireless control device 108a to an address of the wireless control device 108b (1404). The wireless control device 108b may, for example, send a connection request 1002 to the another wireless control device 108a based on the comparing.

According to an example embodiment, the address of the another wireless control device 108a and the address of the wireless control device 108b may each include an Internet Protocol address, and the connection request 102 may include a transmission control protocol connection request.

According to another example embodiment, the wireless control device 108b may determine if the another wireless control device 108a is a member of a peer group with the wireless control device 108b, such as by comparing a peer group included in the discovery message 200 to a peer group of the wireless control device 108b. According to this example, the wireless control device 108b may ignore the discovery message 200 if the another wireless control device 108a is not a member of the peer group of the wireless control device 108b.

According to another example, the wireless control device 108b may notify the another wireless control device 108a of wireless infrastructure nodes 102 managed by the wireless control device 108b.

Figure 15:
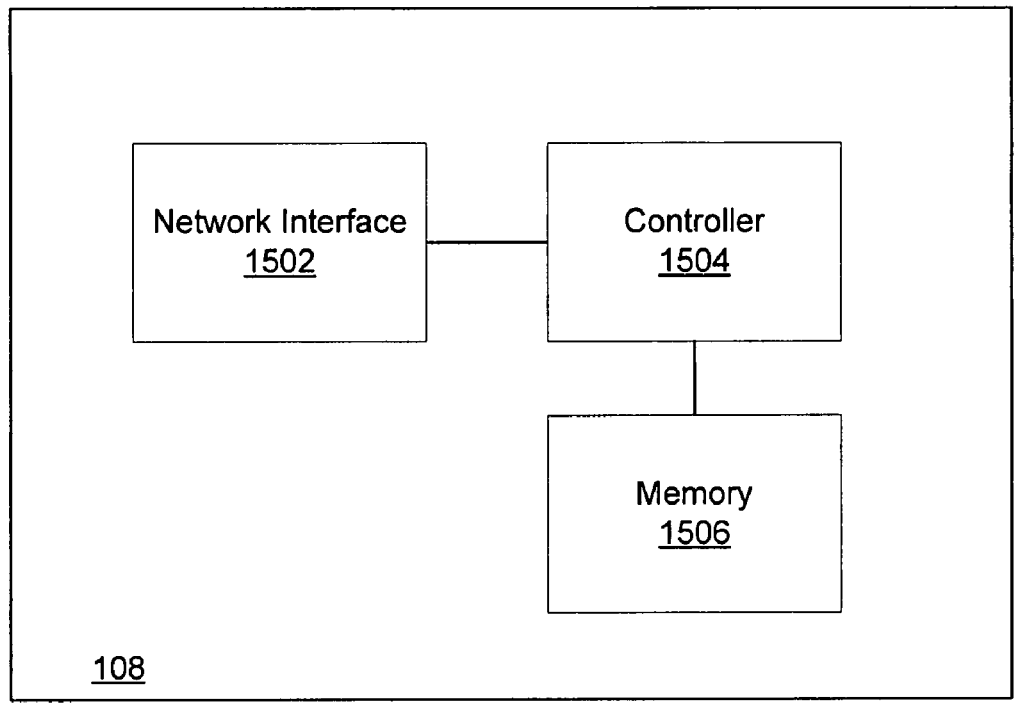
FIG. 15 is a block diagram showing a wireless control device, according to an example embodiment.

FIG. 15 is a block diagram showing a wireless control device 108, according to an example embodiment. The wireless control device 108 may, for example, include a network interface 1502 for communicating with other devices in the network 100, such as wireless infrastructure nodes 102, wireless control devices 108, Dynamic Host Configuration Protocol servers 110, and/or remote management stations 112. The wireless control device 108 may also include a controller 1504, which may cause the wireless control device 108 to perform processes, such as those discussed with reference to FIGS. 1, 3-7 and 9-14. The wireless control device 108 may also include a memory 1506, which may store information such as an address of the wireless control device 108, a peer group of the wireless control device 108, a list of addresses, wireless infrastructure nodes 102 managed by the wireless control device 108, and other information.

Figure 16:
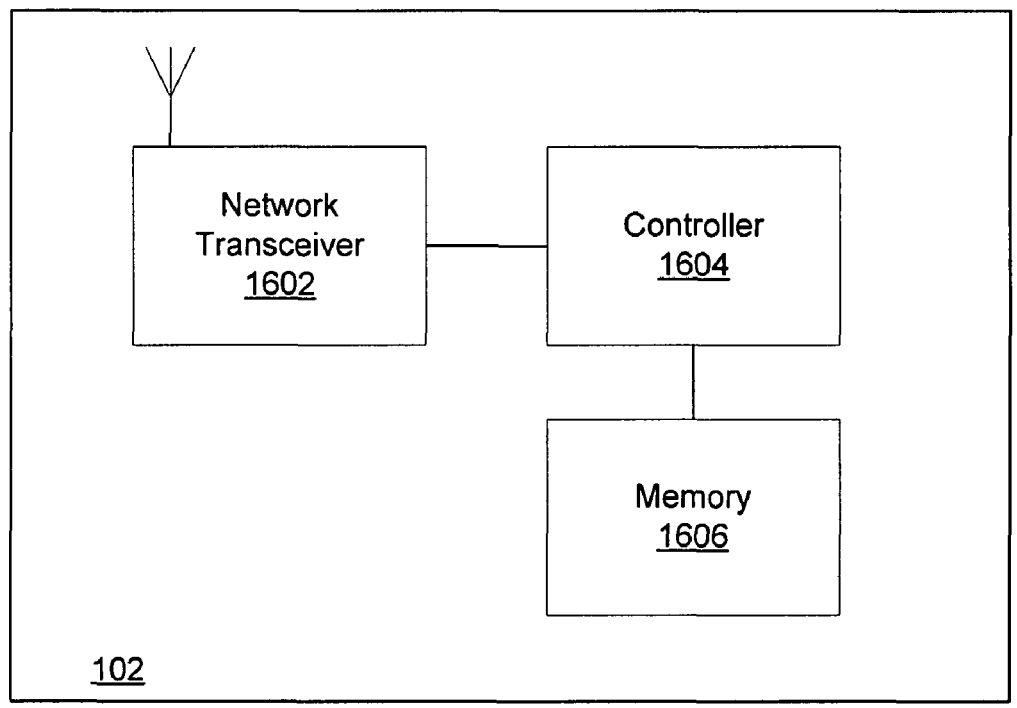
FIG. 16 is a block diagram showing a wireless infrastructure node, according to an example embodiment.

FIG. 16 is a block diagram showing a wireless infrastructure node 102, according to an example embodiment. The wireless infrastructure node 102 may include a network transceiver 1602 for communicating with wireless devices 106 in a wireless network 104, and/or for communicating with other devices in the network 100. The wireless infrastructure node 102 may also include a controller 1604 for performing processes, such as those described with reference to FIGS. 1, 3-6, 8, 9, and 11-13. The wireless infrastructure node 102 may also include a memory 1606 for storing information such as addresses of wireless devices 106, statically assigned addresses, DHCP assigned addresses, a peer group, an address of a wireless control device 108 managing the wireless infrastructure node 102, and other information.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program may be written in any form of programming language, including compiled or interpreted languages, and may be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A wireless infrastructure node comprising:
at least one programmable processor; and at least one memory device configured to store instructions for execution by the at least one programmable processor, the instructions and at least one programmable processor being configured to cause the wireless infrastructure node to:
receive a discovery message from a wireless control device;
determine whether:
the wireless infrastructure node is not statically assigned to another wireless control device; and
the wireless infrastructure node is not being managed by another wireless control device; and
reply to the wireless control device with a connection request if:
the wireless infrastructure node is not statically assigned to another wireless control device; and
the wireless infrastructure node is not being managed by another wireless control device.

2. The wireless infrastructure node of claim 1, wherein the instructions are configured to cause the wireless infrastructure node to receive the discovery message from the wireless control device, the discovery message including an Ethernet frame.

3. The wireless infrastructure node of claim 1, wherein the instructions are configured to cause the wireless infrastructure node to receive the discovery message from the wireless control device, the discovery message including a multicast frame.

4. The wireless infrastructure node of claim 1, wherein the instructions are configured to cause the wireless infrastructure node to receive the discovery message from the wireless control device, the discovery message including a user datagram protocol segment.

5. The wireless infrastructure node of claim 1, wherein the instructions are configured to cause the wireless infrastructure node to receive the discovery message from the wireless control device, the discovery message including an Internet Protocol address.

6. The wireless infrastructure node of claim 1, wherein the instructions are configured to cause the wireless infrastructure node to reply to the wireless control device with the connection request if:
the wireless infrastructure node is not statically associated with another wireless control device;
the wireless infrastructure node is not being managed by another wireless control device; and
a vendor identification included in the discovery message matches a vendor identification of the wireless infrastructure node.

7. The wireless infrastructure node of claim 1, wherein the instructions are configured to cause the wireless infrastructure node to reply to the wireless control device with the connection request if:
the wireless infrastructure node is not statically assigned to another wireless control device;
the wireless infrastructure node is not being managed by another wireless control device; and
a virtual local area network identifier included in the discovery message matches a virtual local area network of the wireless infrastructure node.

8. The wireless infrastructure node of claim 1, wherein the instructions are configured to cause the wireless infrastructure node to reply to the wireless control device with the connection request, the connection request including an Internet Protocol address of the wireless infrastructure node, if:
the wireless infrastructure node is not statically assigned to another wireless control device; and
the wireless infrastructure node is not being managed by another wireless control device.

9. The wireless infrastructure node of claim 1, wherein the instructions are configured to cause the wireless infrastructure node to reply to the wireless control device with the connection request, the connection request including a request for a secure connection, if:
the wireless infrastructure node is not statically assigned to another wireless control device; and
the wireless infrastructure node is not being managed by another wireless control device.

10. The wireless infrastructure node of claim 1, wherein the instructions are configured to cause the wireless infrastructure node to:
receive an address of the wireless control device from a dynamic host configuration protocol server;
send a discovery message to the address of the wireless control device; and
send the connection request to the wireless control device in response to receiving an invitation message from the wireless control device.

11. The wireless infrastructure node of claim 1, wherein the instructions are configured to cause the wireless infrastructure node to:
send a discovery message to a statically assigned address if the wireless infrastructure node is assigned the statically assigned address; and
send the discovery message to a DHCP assigned address if the wireless infrastructure node is assigned the DHCP assigned address by a DHCP server.

12. The wireless infrastructure node of claim 11, wherein the instructions are configured to cause the wireless infrastructure node to:
periodically send the discovery message to the statically assigned address if the wireless infrastructure node is statically assigned the statically assigned address; and
periodically send the discovery message to the DHCP assigned address if the wireless infrastructure node is assigned the DHCP assigned address by a DHCP server.

13. The wireless infrastructure node of claim 11, wherein the instructions are configured to cause the wireless infrastructure node to send the discovery message to the statically assigned address if the wireless infrastructure node is statically assigned the statically assigned address, the discovery message including at least one user datagram protocol segment.

14. The wireless infrastructure node of claim 11, wherein the instructions are configured to cause the wireless infrastructure node to ignore the DHCP assigned address if the wireless infrastructure node is statically assigned the statically assigned address.

* * * * *